United States Patent
Aylott

[11] 3,898,716
[45] Aug. 12, 1975

[54] ROTATABLE STOP FASTENER

[75] Inventor: John F. Aylott, Frimley, England

[73] Assignee: Dzus Fastener Co. Inc., West Islip, N.Y.

[22] Filed: Jan. 31, 1974

[21] Appl. No.: 438,472

[30] Foreign Application Priority Data
Feb. 1, 1973 United Kingdom.................. 5127/73

[52] U.S. Cl. ............................................. 24/221 K
[51] Int. Cl.² ........................................ A44B 17/00
[58] Field of Search........... 24/221 K, 221 R, 221 A

[56] References Cited
UNITED STATES PATENTS

| | | | |
|---|---|---|---|
| 1,360,613 | 11/1920 | Baia.................................. | 24/221 K |
| 1,971,450 | 8/1934 | Heitmuller....................... | 24/221 A |
| 2,204,829 | 6/1940 | Shippee ........................... | 24/221 A |
| 2,350,255 | 5/1944 | Shippee ........................... | 24/221 A |
| 2,421,204 | 5/1947 | Jung................................. | 24/221 A |
| 2,580,666 | 1/1952 | Dzus ................................ | 24/221 K |
| 2,797,464 | 7/1957 | Zahodiakin ...................... | 24/221 K |
| 2,975,667 | 3/1961 | Bross................................ | 24/221 K |
| 3,152,822 | 10/1964 | Griffiths........................... | 24/221 K |
| 3,495,307 | 2/1970 | Metz................................. | 24/221 K |

Primary Examiner—Bernard A. Gelak

[57] ABSTRACT

The invention relates to a quick release fastener of the kind which is arranged releasably to connect two members, such as panels, and which comprises a stud assembly arranged to extend through an opening in one of the members and a complementary socket carried by the other of the members the locking of the fastener being achieved by a boyonet type coupling. The fastener has a compression spring surrounding a shank of said stud and which is arranged to urge said stud out of said socket, and a cam slot or slots in said stud shank or in said socket adapted to cooperate with a corresponding pin or pins in said socket or on said shank respectively, said cam slot or slots being so arranged that when said stud is pushed into said socket against the action of said compression spring said pin or pins contact said cam slots rotating said stud into a locking position.

5 Claims, 3 Drawing Figures

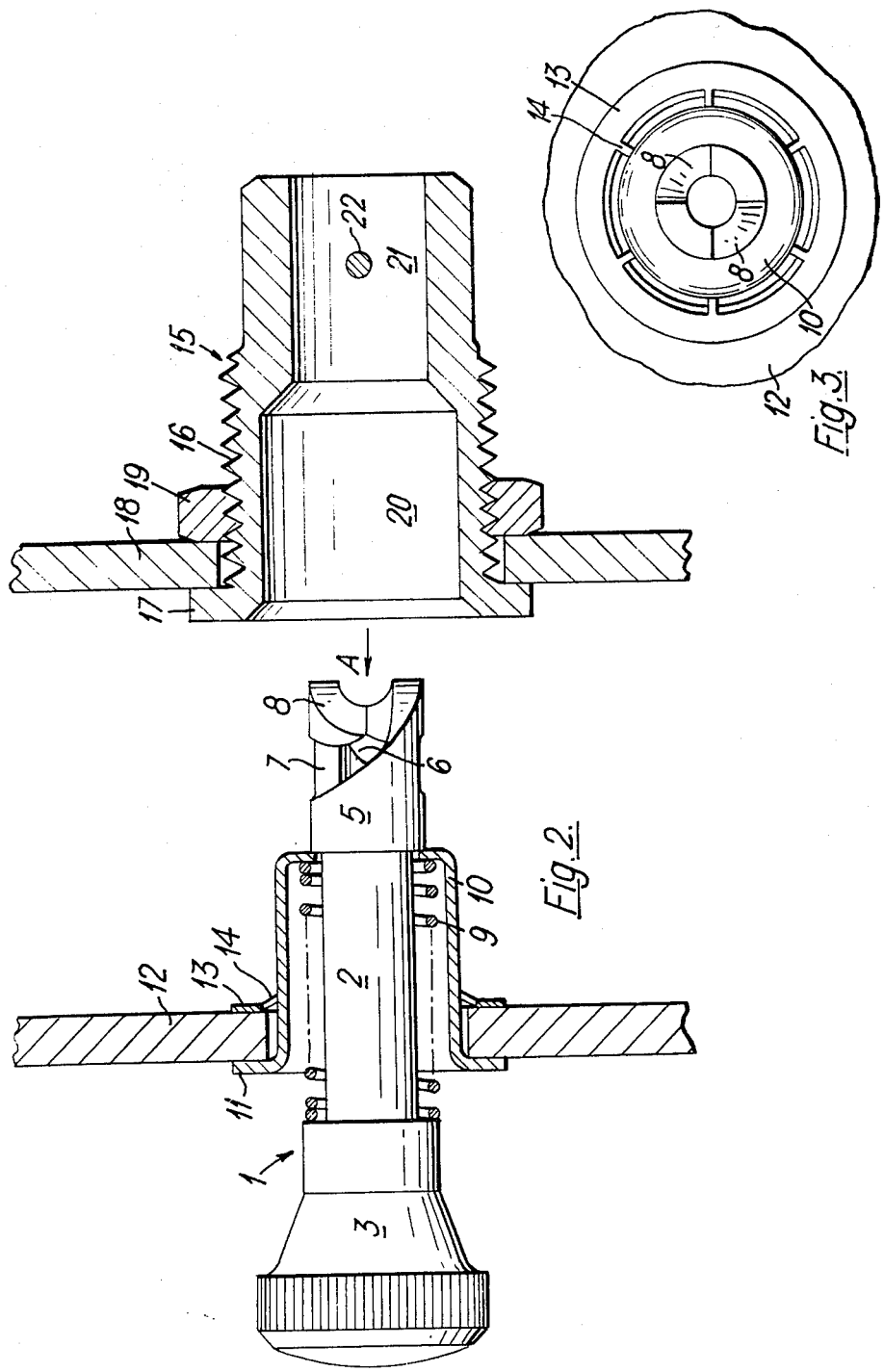

ROTATABLE STOP FASTENER

This invention is concerned with a quick release fastener of the kind which is arranged releasably to connect two members, such as panels, and which comprises a stud assembly arranged to extend through an opening in one of the members and a complementary socket carried by the other of the members the locking of the fastener being achieved by a bayonet type coupling (hereinafter referred to as "of the kind described").

In accordance with the present invention such a fastener comprises a stud part, a socket part arranged to receive the stud part, and a compression spring which in use surrounds a shank of the stud and which is arranged to urge the stud out of the socket in use, a cam slot or slots in the stud shank or in the socket cooperating with a corresponding pin or pins in the socket or on the shank respectively, the cam slot or slots being so arranged that when the stud is pushed into the socket against the action of the compression spring the pin or pins contact the cam slots rotating the stud into a locking position, this locking position being maintained by the action of the compression spring.

Thus, a fastener of this type can be locked merely by the axial movement of the stud into the socket, the movement of the bayonet type fixing into its locked position being caused by rotation produced, as a result of the axial movement, by the cam surfaces. These fasteners are therefore easily and quickly inserted.

Preferably, a grommet piece is located around the shank of the stud and is retained on the stud, the compression spring acting between a shoulder at a head end of the stud and a corresponding shoulder in the grommet. This arrangement of the grommet about the stud shank enables the spring to be retained on the stud which of course prevents it being lost by careless handling. The grommet may have an elongate body through which the shank of the stud extends and may have a shoulder portion such that the grommet may be mounted in an opening in one of two members which are to be joined together and retained therein by a retaining washer thus holding the panel between the shoulder and the retaining washer. The elongation of the grommet may provide for the fixing of various thicknesses of panel.

The socket part of the fastener can have an external screw thread and a shoulder such that the socket may be arranged to extend through an opening in the second of the two members and retained therein by a locking nut threaded on the external screw thread.

In order to release the fastener from its locked position all that is necessary is for the stud to be rotated so that the pin or pins leave the locked position in the cam slot or slots, the action of the compression spring then pushing the stud out of engagement with the socket.

One example of a fastener constructed in accordance with the present invention will now be described with reference to the accompanying drawings, in which:

FIG. 2 is an exploded side view, again partly sectioned; and,

FIG. 3 is an axial view on arrow A of FIG. 2.

Figure 1:
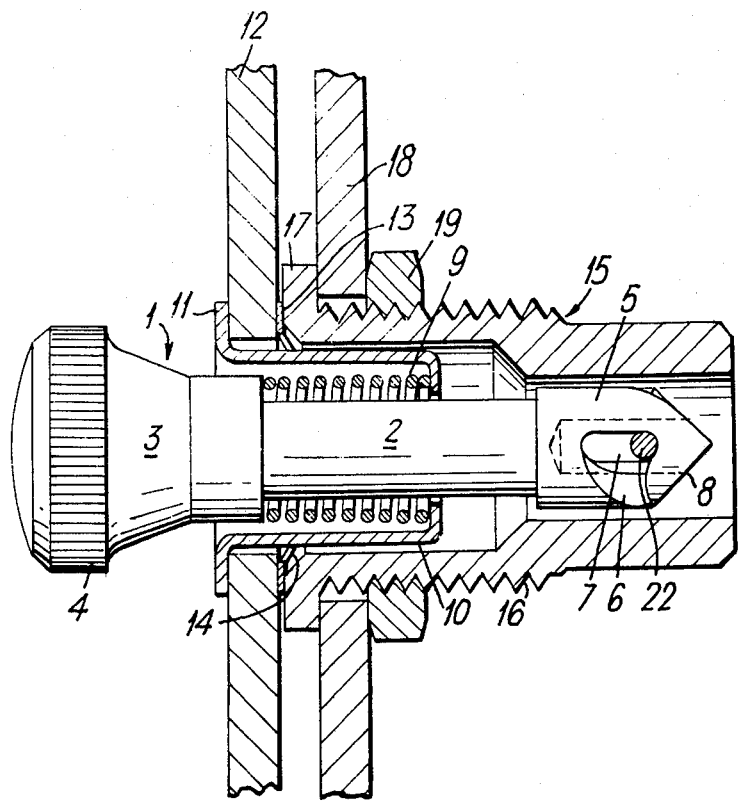
FIG. 1 is a part sectioned side view of the fastener.

The fastener has a stud 1 having a cylindrical shank 2 at the one end of which there is a head part 3 of increased diameter thus providing a shoulder for a compression spring to bear against. The circular periphery 4 of the head is knurled so that a good grip may be obtained on it when it is necessary to release the fastener. At the other end of the cylindrical shank a hollow second wider portion 5 is formed but this is only slightly wider than the main part of the shank. In this second wider portion two cam slots 6 are arranged approximately at 45° to the axis of the stud and at the closed ends of the slots axial slots 7 extend away from the head end of the stud thus forming a locking portion in which a corresponding pin or pins may be locked. In order to ensure that when the stud is pushed into its socket the cam slots and associated pins will engage automatically, two further surfaces 8 are cut, approximately at 90° to the cam slots, thus forming a mitre-shaped end to the stud.

Around the cylindrical shank 2 of the stud there is a compression spring 9 which bears, at one end, against the external shoulder formed by the head 3 of the stud, and at the other end against an internal shoulder of an elongate grommet 10 which surrounds the shank 2 of the stud. The internal shoulder of the grommet not only serves to bear against the compression spring 9 but also retains the grommet on the stud shank by virtue of the fact that its diameter at the shoulder is less than that of the mitred end 5 of the stud. The other end of the grommet 10 has an external shoulder 11 so that the grommet can be inserted through a hole in a panel 12 and a retaining washer 13 having several inwardly projecting tangs 14 may be pushed over the elongate body of the grommet thus mounting the combined grommet, spring, and stud assembly on the panel 12.

The socket portion 15 of the fastener is generally cylindrical, but has a threaded portion 16 of greater diameter than the general diameter of the socket, and a head part 17 of diameter greater than the diameter of the thread. Thus, the socket may be located through a hole in a second panel 18 and a locking nut 19 tightened up, thus gripping the second panel between the head portion and the locking nut. The interior of the socket has two cylindrical portions 20 and 21, one at the head end of the socket (numbered 20), of a diameter slightly greater than the external diameter of the grommet so that the grommet may fit within this portion. The second cylindrical portion 21 of the socket extends from the first portion 20 away from the head part and is of a reduced diameter such that the mitred end of the stud 1, which has the cam slots 6, can enter this portion and so that the cam slots may cooperate with a pin 22 which extends across the cylindrical socket portion, to lock the fastener assembly.

The fastener is locked by the insertion of the stud 1 into the socket 15, the mitred end of the stud 1 contacting the pin 22 which extends across the socket and the pin thus moving into the cam slots and being held in the axially extending slots in the locked position. To unlock the fastener all that is necessary is for the knurled head 3 of the stud to be turned, by hand say, overcoming the locking action of the compression spring and allowing the pin to move out of the cam slots under the action of the compression spring.

Of course, the positions of the pin and cam surfaces may be interchanged so that for example the pin is formed as a T-shaped end on the stud and the cam slots are cut in an edge wall of the socket.

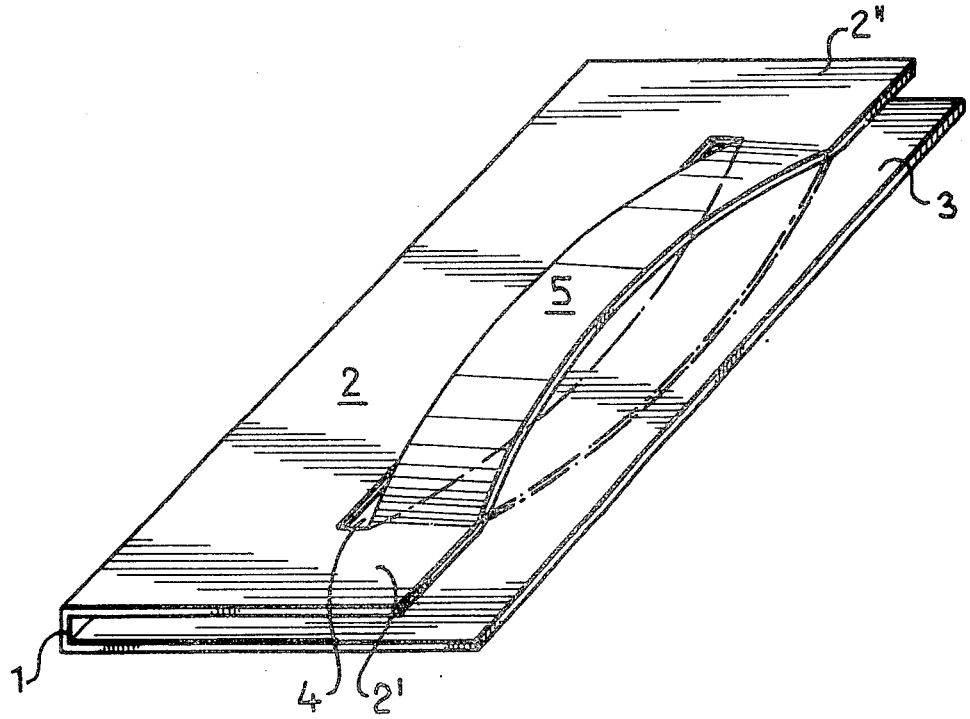

I claim:

United States Patent [19]
Schwartz

[11] 3,898,717
[45] Aug. 12, 1975

[54] RELEASABLE PAPER CLIP

[75] Inventor: Hermann Schwartz, Pfaffikon, Switzerland

[73] Assignee: Siegfried Peyer, Basch, Switzerland

[22] Filed: Oct. 9, 1973

[21] Appl. No.: 404,608

[30] Foreign Application Priority Data
Oct. 10, 1972 Switzerland.................... 14767/72

[52] U.S. Cl.................................... 24/259; 132/46
[51] Int. Cl.² ........................................ A44B 21/00
[58] Field of Search............ 24/259 PF; 132/46, 259

[56] References Cited
UNITED STATES PATENTS
1,851,013   3/1932   Michaud et al. ................ 24/259 PF
3,082,773   3/1963   Renstrom et al. ............... 24/259 HC
3,416,202   12/1968  Sasaoka.......................... 24/259 HC Primary Examiner—Paul R. Gilliam
Assistant Examiner—Doris L. Troutman
Attorney, Agent, or Firm—William R. Woodward

[57] ABSTRACT

A paper clip is made of sheet metal folded over in a U-shaped profile to provide parallel clip faces and one of the clip faces has at least one slit bordering a strip of the sheet metal which is bowed out, so as to form a bistable spring portion. The spring strip is bowed out for inserting the clip. Finger pressure on the strip snaps it into its clipping position and finger pressure on the clip face beyond the ends of the bowed strip will snap the strip back into its open position for release of the papers.

4 Claims, 2 Drawing Figures